United States Patent

Imashiro et al.

[11] Patent Number: 5,338,794
[45] Date of Patent: Aug. 16, 1994

[54] PROCESS FOR PRODUCING SOLUTION OF HIGH-MOLECULAR WEIGHT POLYCARBODIIMIDE

[75] Inventors: Yasuo Imashiro; Ikuo Takahashi, both of Tokyo, Japan

[73] Assignee: Nisshinbo Industries, Inc., Tokyo, Japan

[21] Appl. No.: 992,031

[22] Filed: Dec. 17, 1992

[30] Foreign Application Priority Data

Dec. 27, 1991 [JP] Japan ................. 3-359565

[51] Int. Cl.$^5$ ............ C08L 79/00; C08K 5/02
[52] U.S. Cl. ................ 524/792; 524/710; 524/793; 524/873; 528/44; 528/48; 528/51; 528/67
[58] Field of Search ........... 524/792, 793, 873, 710; 528/51, 44, 48, 51, 67

[56] References Cited

U.S. PATENT DOCUMENTS

| | | | |
|---|---|---|---|
| 2,853,473 | 9/1958 | Campbell et al. | 528/51 |
| 2,941,966 | 6/1960 | Campbell | 528/51 |
| 2,941,983 | 6/1960 | Smeltz | 528/51 |
| 3,929,733 | 12/1975 | Alberino et al. | 528/51 |
| 3,960,950 | 6/1976 | Hansen | 528/51 |
| 4,067,820 | 1/1978 | Wagner et al. | 528/51 |
| 4,088,665 | 5/1978 | Findeisen et al. | 528/51 |
| 4,105,643 | 8/1978 | Smith | 528/51 |
| 4,344,855 | 8/1982 | Schäfer et al. | 528/51 |

FOREIGN PATENT DOCUMENTS

| | | | |
|---|---|---|---|
| 651629 | 11/1962 | Canada | 528/51 |
| 2202906 | 8/1990 | Japan | 528/51 |

Primary Examiner—John Kight, III
Assistant Examiner—Rabon Sergent
Attorney, Agent, or Firm—Adduci, Mastriani, Schaumberg & Schill

[57] ABSTRACT

A process for producing a high-molecular weight polycarbodiimide solution by subjecting isophorone diisocyanate, 4,4'-dicyclohexylmethane diisocyanate, tetramethylxylylene diisocyanate or a mixture thereof to decarboxylation and condensation reaction in the presence of a carbodiimidization catalyst, in which process tetrachloroethylene, trichloroethylene, tetrachloroethane, trichloroethane or a mixture thereof is used as the polymerization solvent, the monomer concentration is 18% by weight or less, and the reaction temperature is 80° C. or above.

2 Claims, 1 Drawing Sheet

PROCESS FOR PRODUCING SOLUTION OF HIGH-MOLECULAR WEIGHT POLYCARBODIIMIDE

BACKGROUND OF THE INVENTION

1. Field of the Invention

The present invention relates to a process for producing a solution of a high-molecular weight polycarbodiimide. More particularly, the present invention relates to a process for producing a solution of a high-molecular weight polycarbodiimide, having excellent storage stability by appropriately selecting the reaction conditions for said production, such as monomer types, monomer concentrations and the like.

2. Description of the Prior Art

It is well known to produce a polycarbodiimide by subjecting an organic diisocyanate to a decarboxylation and condensation reaction in the presence of a carbodiimidization catalyst. In this production, an aromatic diisocyanate has been used as the organic diisocyanate in most cases.

The applications of polycarbodiimides have been widened recently. As a result, it has been pointed out that the polycarbodiimides produced from an organic diisocyanate as mentioned above have a problem of generating aromatic amines having a bad odor, when subjected to treatments such as incineration and the like. Hence, polycarbodiimides derived from an aliphatic diisocyanate, free from the above problem have come to draw attention.

As one conventional process for producing a polycarbodiimide from an aliphatic diisocyanate, there is disclosed, in Japanese Patent Application Kokai (Laid-Open) No. 187029/1984, a process which comprises producing a polycarbodiimide solution from aliphatic mono-, di- and tri- isocyanates in an acetate type solvent (total monomer concentration=50% by weight or less) in the presence of a carbodiimidization catalyst (e.g. 3-methyl-1-phenyl-2-phospholene-1-oxide) at an appropriate temperature (120°–160° C.). This process, however, has had an inconvenience that nitrogen need be continuously sprayed in order to promote the completion of the reaction.

The present invention relates to a process for producing a polycarbodiimide derived from an aliphatic diisocyanate and has been completed as a result of extensive research made on the reaction conditions such as polymerization solvent, monomer concentrations, reaction temperature and the like. The present invention provides a process for producing a high-molecular weight polycarbodiimide solution of good stability very easily and simply, which process is free from the above-mentioned problems of the prior art.

SUMMARY OF THE INVENTION

According to the present invention, there is provided a process for producing a high-molecular weight polycarbodiimide solution by subjecting an aliphatic diisocyanate to a decarboxylation and condensation reaction in the presence of a carbodiimidization catalyst, in which process a halogen-containing solvent or a mixed solvent thereof is used as the polymerization solvent, the monomer concentration is 18% by weight or less, and the reaction temperature is 80° C. or above.

DESCRIPTION OF THE INVENTION

Figure 1:
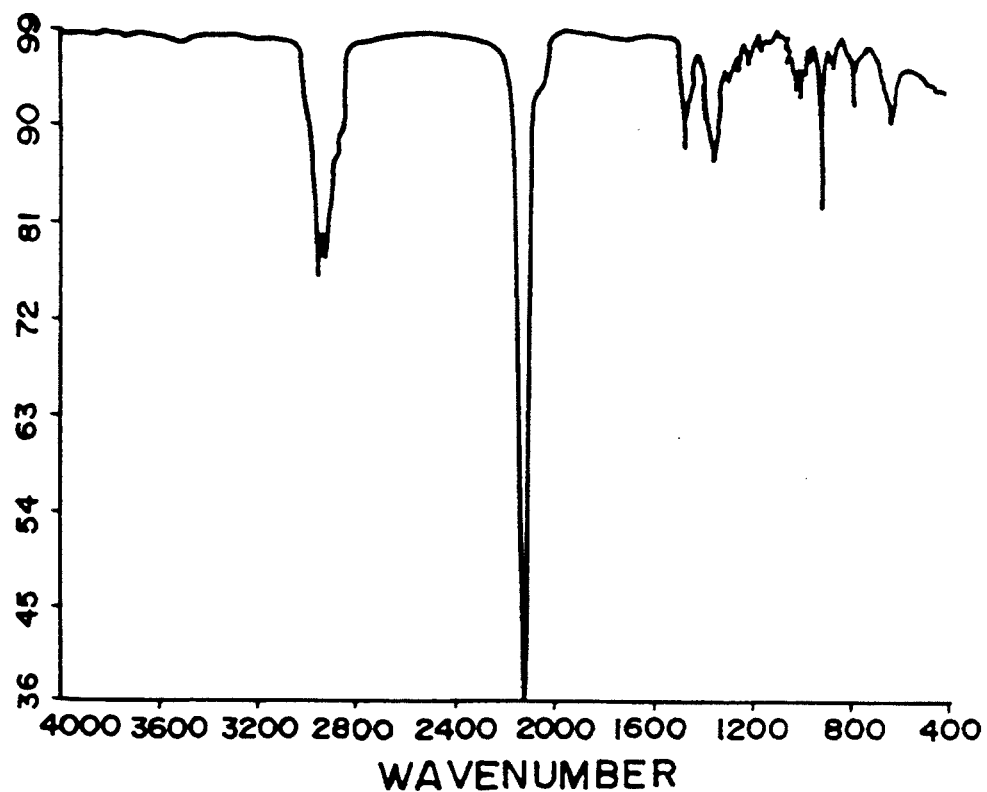
FIG. 1 is an IR absorption spectrum of the polycarbodiimide solution of the present invention obtained in Example 1.

The present invention is hereinafter described in detail.

In the present invention, an aliphatic diisocyanate is used as the raw material monomer. The aliphatic diisocyanate is preferably isophorone diisocyanate, 4,4'-dicyclohexylmethane diisocyanate, tetramethylxylylene diisocyanate or a mixture thereof.

It is necessary that there be used, as the polymerization solvent, a halogen-containing solvent (e.g. tetrachloroethylene, trichloroethylene, tetrachloroethane, trichloroethane) or a mixture thereof, preferably tetrachloroethylene, trichloroethylene or a mixture thereof, and that the reaction be conducted at 80° C. or above. When there is used a low-boiling solvent such as chloroform, carbon tetrachloride or the like, the reaction proceeds slightly but stops in the course; as a result, the isocyanate remains unreacted in a large amount and no polycarbodiimide solution is obtained. When it is attempted to conduct the reaction until no isocyanate remains, the reaction system gives rise to gelling and no polycarbodiimide solution is obtained.

The monomer concentration at the start of the reaction is desirably 18% by weight or less, preferably 12% by weight or less. Even when one of the above-mentioned halogen-containing solvents or a mixture thereof is used as the polymerization solvent, if the monomer concentration is more than 18% by weight, the resulting polycarbodiimide solution has inferior stability and, when allowed to stand at room temperature, gives rise to gelling in most cases; as the monomer concentration increases in the range exceeding 18% by weight, the amount of remaining isocyanate increases and the resulting reaction mixture cannot be regarded as a high-molecular weight polycarbodiimide solution.

The decarboxylation and condensation reaction of the present invention is conducted in the presence of a carbodiimidization catalyst. As the carbodiimidization catalyst, there can be used, for example, phospholene oxides such as 3-methyl-1-phenyl-2-phospholene-1-oxide, 1-phenyl-2-phospholene-1-oxide, 3-methyl-2-phospholene-1-oxide, 1-ethyl-3-methyl-2-phospholene-1-oxide, 1-ethyl-2-phospholene-1-oxide, 3- phospholene isomers thereof and the like. 3-Methyl-1-phenyl-2-phospholene-1-oxide is preferable in view of the catalytic activity.

The polycarbodiimide solution obtained by the present process was subjected to IR absorption spectrometry. It indicated that there was no absorption by isocyanate group at 2260 cm$^1$. As a result, the absence of any remaining isocyanate was confirmed.

Further, titration for isocyanate was conducted by the dibutylamine method. However, no isocyanate was detected. This method also indicates that there was produced a high-molecular polycarbodiimide solution containing substantially no isocyanate.

Thus, the term "high-molecular weight" means in this specification, that the reaction of the present invention proceeds to an extent such that substantially no isocyanate remains after the completion of the reaction.

The present invention is hereinafter described in more detail by way of Examples.

EXAMPLE 1

187.1 g of isophorone diisocyanate was subjected to a reaction in 850 g of tetrachloroethylene (resin concentration=15% by weight) in the presence of 1.87 g of a carbodiimidization catalyst (3-methyl-1-phenyl-2-phospholene-1-oxide, the same catalyst was used also hereinafter) at 120° C. for 48 hours, to obtain a polycarbodiimide solution. The IR absorption spectrum of the polycarbodiimide solution is shown in FIG. 1. As is clear from FIG. 1, there was no absorption of isocyanate at 2260 cm$^1$; the reaction proceeded to a such an extent that there remained no unreacted isocyanate; and a high-molecular weight polycarbodiimide solution was produced. There was no absorption of any by-product, either.

The solution was stable for 3 months at room temperature and for 6 months in a refrigerator of 5° C., and had excellent storage stability.

EXAMPLE 2

156 g of isophorone diisocyanate was subjected to a reaction in 1110 g of tetrachloroethylene (resin concentration=10% by weight) in the presence of 1.56 g of the carbodiimidization catalyst at 120° C. for 54 hours, to obtain a polycarbodiimide solution. The solution was stable for 3 months at room temperature and for 6 months in a refrigerator of 5° C.

EXAMPLE 3

65.5 g of isophorone diisocyanate was subjected to a reaction in 1000 g of tetrachloroethylene (resin concentration=5% by weight) in the presence of 0.16 g of the carbodiimidization catalyst at 120° C. for 138 hours, to obtain a polycarbodiimide solution. The solution was stable for 3 months at room temperature and for 6 months in a refrigerator of 5° C.

COMPARATIVE EXAMPLE 1

65.5 g of isophorone diisocyanate was kept in 1000 g of chloroform (resin concentration=5% by weight) in the presence of 0.66 g of the carbodiimidization catalyst at 61° C. for 128 hours. A reaction proceeded slightly but stopped in the course. The isocyanate remained unreacted in a large amount, and no polycarbodiimide solution was obtained.

COMPARATIVE EXAMPLE 2

65.5 g of isophorone diisocyanate was kept in 1000 g of carbon tetrachloride (resin concentration=5% by weight) in the presence of 0.66 g of the carbodiimidization catalyst at 78° C. for 173 hours. A reaction proceeded slightly but stopped in the course. The isocyanate remained unreacted in a large amount, and no polycarbodiimide solution was obtained.

COMPARATIVE EXAMPLE 3

Polycarbodiimide synthesis was conducted in the same manner as disclosed in Japanese Patent Publication No. 187029/1984. 68.8 g of butyl isocyanate and 231.2 g of isophorone diisocyanate were reacted in 270 g of amyl acetate (resin concentration=50% by weight) in the presence of 30 g of a xylene solution containing 10% by weight of the carbodiimidization catalyst, at 140° C. for 23 hours. However, there was no progress of reaction because no nitrogen was sprayed.

COMPARATIVE EXAMPLE 4

52.4 g of isophorone diisocyanate was kept in 800 g of amyl acetate (resin concentration=5% by weight) in the presence of 0.13 g of the carbodiimidization catalyst at 140° C. for 31 hours. However, there was no progress of reaction because no nitrogen was sprayed, and no polycarbodiimide solution was obtained.

COMPARATIVE EXAMPLE 5

561 g of isophorone diisocyanate was subjected to a reaction in 450 g of tetrachloroethylene (resin concentration=50% by weight) in the presence of 5.61 g of the carbodiimidization catalyst at 120° C. However, gelling occurred in 6 hours and no polycarbodiimide solution was obtained.

COMPARATIVE EXAMPLE 6

200 g of isophorone diisocyanate was subjected to a reaction in 640 g of tetrachloroethylene (resin concentration=20% by weight) in the presence of 2.00 g of the carbodiimidization catalyst at 120° C. However, gelling occurred in 42 hours and no polycarbodiimide solution was obtained.

EXAMPLE 4

Figure 2:
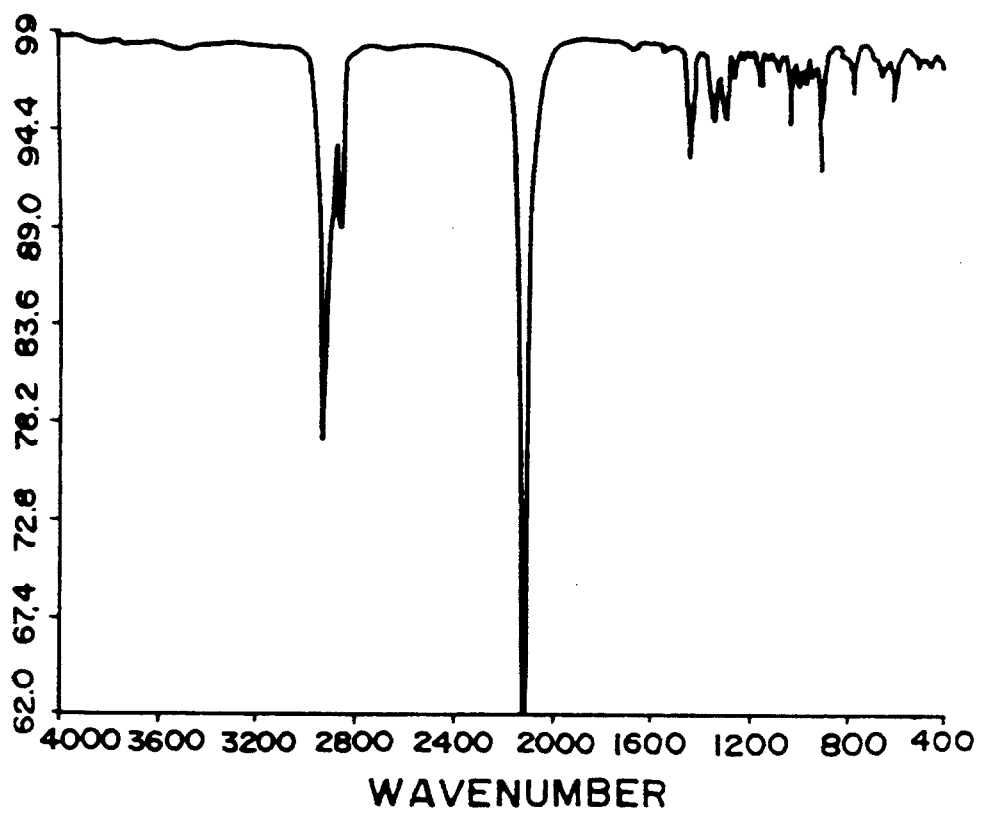
FIG. 2 is an IR absorption spectrum of the polycarbodiimide solution of the present invention obtained in Example 4.

120.6 g of 4,4'-dicyclohexylmethane diisocyanate was subjected to a reaction in 868 g of tetrachloroethylene (resin concentration=10% by weight) in the presence of 1.20 g of the carbodiimidization catalyst at 120° C. for 144 hours to obtain a polycarbodiimide solution. The IR absorption spectrum of the polycarbodiimide solution is shown in FIG. 2. As is clear from FIG. 2, there was no absorption of isocyanate at 2260 cm$^{-1}$; the reaction proceeded to a such an extent that there remained no unreacted isocyanate; and a high-molecular weight polycarbodiimide solution was produced. There was no absorption of any by-product, either.

The solution was stable for 3 months at room temperature.

EXAMPLE 5

156 g of isophorone diisocyanate was subjected to a reaction in 1110 g of trichloroethylene (resin concentration=10% by weight) in the presence of 1.56 g of the carbodiimidization catalyst at 87° C. for 96 hours to obtain a polycarbodiimide solution. The solution was stable at room temperature for 3 months.

EXAMPLE 6

140 g of 4,4'-dicyclohexylmethane diisocyanate was subjected to a reaction in 1000 g of trichloroethylene (resin concentration=10% by weight) in the presence of 1.40 g of the carbodiimidization catalyst at 87° C. for 192 hours to obtain a polycarbodiimide solution. The solution was stable at room temperature for 3 months.

EXAMPLE 7

65.5 g of isophorone diisocyanate and 63.5 g of 4,4'-dicyclohexylmethane diisocyanate were reacted in 1000 g of tetrachloroethylene (resin concentration=10% by weight) in the presence of 1.29 g of the carbodiimidization catalyst at 120° C. for 60 hours to obtain a polycarbodiimide solution. The solution was stable at room temperature for 3 months.

EXAMPLE 8

156 g of isophorone diisocyanate was subjected to a reaction in 1110 g of a tetrachloroethylene-trichloroethylene (2:1) mixed solvent (resin concentration=10% by weight) in the presence of 1.56 g of the carbodiimidization catalyst at the reflux temperature of the mixed solvent for 60 hours to obtain a polycarbodiimide solution. The solution was stable at room temperature for 3 months.

EXAMPLE 9

156 g of isophorone diisocyanate was subjected to a reaction in 1110 g of a tetrachloroethylene-trichloroethylene (1:2) mixed solvent (resin concentration=10% by weight) in the presence of 1.56 g of the carbodiimidization catalyst at the reflux temperature of the mixed solvent for 72 hours to obtain a polycarbodiimide solution. The solution was stable at room temperature for 3 months.

COMPARATIVE EXAMPLE 7

312 g of isophorone diisocyanate was subjected to a reaction in 1000 g of a tetrachloroethylene-trichloroethylene (2:1) mixed solvent (resin concentration=20% by weight) in the presence of 3.12 g of the carbodiimidization catalyst at the reflux temperature of the mixed solvent. Gelling occurred in 48 hours and no polycarbodiimide solution was obtained.

REFERENCE EXAMPLE 1

The polycarbodiimide solution obtained in Example 1 was concentrated to a 50 weight % concentration. The concentrated solution was cast on a glass plate and dried at 60° C. for 6 hours and then at 120° C. for 6 hours to obtain a film on the glass plate. The film was amber and transparent and had neither unevenness nor void on the surface.

REFERENCE EXAMPLE 2

The polycarbodiimide solution obtained in Example 3 was concentrated to a 50 weight % concentration. The concentrated solution was cast on a glass plate and dried at 60° C. for 6 hours and then at 120° C. for 6 hours to obtain a film on the glass plate. The film was light yellow and transparent and had neither unevenness nor void on the surface.

In the present invention, a high-molecular weight polycarbodiimide solution having stability can be obtained very easily and simply by specifying the reaction conditions such as polymerization solvent, monomer concentration and the like as above.

The high-molecular weight polycarbodiimide solution of the present invention has excellent storage stability and can be used as a varnish industrially. Further, the film obtained by casting the solution has superior mechanical properties than a film obtained by conventional press molding.

What is claimed is:

1. A process for producing a high-molecular weight polycarbodiimide solution by subjecting an aliphatic diisocyanate selected from the group consisting of isophorone diisocyanate, 4,4'-dicyclohexylmethane diisocyanate, tetramethylxylylene diisocyanate and mixtures thereof to decarboxylation and condensation reaction in the presence of a carbodiimidization catalyst, in which process, a solvent selected from the group consisting of tetrachloroethylene, trichloroethylene, tetrachloroethane, trichloroethane and mixtures thereof is used as the polymerization solvent; the monomer concentration is 18% by weight or less, and the reaction temperature is 80° C. or above.

2. A process according to claim 1, wherein the carbodiimidization catalyst is 3-methyl-1-phenyl-2-phospholene-1-oxide.

* * * * *